United States Patent
Bennett

(10) Patent No.: US 9,058,321 B2
(45) Date of Patent: Jun. 16, 2015

(54) SUPPORT FOR INTERNATIONAL SEARCH TERMS—TRANSLATE AS YOU CRAWL

(75) Inventor: James D. Bennett, Hroznetin (CZ)

(73) Assignee: Enpluz, LLC, Austin, TX (US)

( * ) Notice: Subject to any disclaimer, the term of this patent is extended or adjusted under 35 U.S.C. 154(b) by 0 days.

(21) Appl. No.: 13/589,314

(22) Filed: Aug. 20, 2012

(65) Prior Publication Data

US 2012/0317090 A1    Dec. 13, 2012

Related U.S. Application Data

(63) Continuation of application No. 12/437,611, filed on May 8, 2009, now Pat. No. 8,250,083.

(60) Provisional application No. 61/053,712, filed on May 16, 2008.

(51) Int. Cl.
*G06F 17/30* (2006.01)
*G06F 17/28* (2006.01)

(52) U.S. Cl.
CPC ........ *G06F 17/289* (2013.01); *G06F 17/30864* (2013.01); *G06F 17/30902* (2013.01); *G06F 17/3097* (2013.01)

(58) Field of Classification Search
CPC ..................... G06F 17/30864; G06F 17/3097
USPC .................. 707/756, 722, 759–760, E17.073, 707/709–710
See application file for complete search history.

(56) References Cited

U.S. PATENT DOCUMENTS

| | | |
|---|---|---|
| 4,882,675 A | 11/1989 | Nichtberger et al. |
| 5,239,462 A | 8/1993 | Jones et al. |
| 5,339,392 A | 8/1994 | Risberg et al. |
| 5,729,693 A | 3/1998 | Holda-Fleck |
| 5,732,400 A | 3/1998 | Mandler et al. |
| 5,765,144 A | 6/1998 | Larche et al. |
| 5,797,133 A | 8/1998 | Jones et al. |
| 5,903,721 A | 5/1999 | Sixtus |
| 5,937,391 A | 8/1999 | Ikeda et al. |
| 5,940,811 A | 8/1999 | Norris |
| 5,943,424 A | 8/1999 | Berger |
| 5,963,915 A | 10/1999 | Kirsch |
| 5,984,180 A | 11/1999 | Albrecht |
| 6,009,412 A | 12/1999 | Storey |
| 6,014,645 A | 1/2000 | Cunningham |
| 6,029,149 A | 2/2000 | Dykstra et al. |
| 6,052,674 A | 4/2000 | Zervides et al. |
| 6,055,513 A | 4/2000 | Katz et al. |

(Continued)

*Primary Examiner* — Thu-Nguyet Le

(74) *Attorney, Agent, or Firm* — Garlick & Markison; Bruce E. Garlick

(57) ABSTRACT

A search engine server delivers search results to a web browser of a client device communicatively coupled to the search engine server via the Internet. The system identifies new web pages in a source language during crawling, translates them into a plurality of destination languages, creates reverse indexes in respective languages, and stores both reverse indexes and cache web pages in a database. Upon the entry of search strings by a user using a web browser, the search engine server responds by delivering links of web pages in the user-desired language (the language of the search string or a language chosen by the user) as well as web pages translated from a plurality of destination languages, ranked based upon popularity or other means. The search engine server contains a plurality of translators that translate new web pages, links that are obtained during crawling, in to a plurality of destination languages.

20 Claims, 10 Drawing Sheets

(56) References Cited

U.S. PATENT DOCUMENTS

| | | |
|---|---|---|
| 6,055,514 A | 4/2000 | Wren |
| 6,088,686 A | 7/2000 | Walker et al. |
| 6,141,006 A | 10/2000 | Knowlton et al. |
| 6,141,915 A | 11/2000 | Anderson et al. |
| 6,144,948 A | 11/2000 | Walker et al. |
| 6,167,385 A | 12/2000 | Hartley-Urquhart |
| 6,175,922 B1 | 1/2001 | Wang |
| 6,208,979 B1 | 3/2001 | Sinclair |
| 6,233,566 B1 | 5/2001 | Levine et al. |
| 6,236,975 B1 | 5/2001 | Boe et al. |
| 6,285,983 B1 | 9/2001 | Jenkins |
| 6,289,319 B1 | 9/2001 | Lockwood |
| 6,311,169 B2 | 10/2001 | Duhon |
| 6,324,521 B1 | 11/2001 | Shiota et al. |
| 6,324,524 B1 | 11/2001 | Lent et al. |
| 6,370,514 B1 | 4/2002 | Messner |
| 6,385,591 B1 | 5/2002 | Mankoff |
| 6,385,594 B1 | 5/2002 | Lebda et al. |
| 6,393,436 B1 | 5/2002 | Vaimberg-Araujo |
| 6,405,181 B2 | 6/2002 | Lent et al. |
| 6,405,281 B1 | 6/2002 | Akerib |
| 6,434,607 B1 | 8/2002 | Haverstock et al. |
| 6,453,306 B1 | 9/2002 | Quelene |
| 6,466,981 B1 | 10/2002 | Levy |
| 6,477,575 B1 | 11/2002 | Koeppel et al. |
| 6,477,580 B1 | 11/2002 | Bowman-Amuah |
| 6,484,149 B1 | 11/2002 | Jammes et al. |
| 6,505,773 B1 | 1/2003 | Palmer |
| 6,507,823 B1 | 1/2003 | Nel |
| 6,530,880 B2 | 3/2003 | Pagliuca |
| 6,567,791 B2 | 5/2003 | Lent et al. |
| 6,587,841 B1 | 7/2003 | Defrancesco et al. |
| 6,594,640 B1 | 7/2003 | Postrel |
| 6,611,816 B2 | 8/2003 | Lebda et al. |
| 6,615,253 B1 | 9/2003 | Bowman-Amuah |
| 6,658,393 B1 | 12/2003 | Basch et al. |
| 6,684,196 B1 | 1/2004 | Mini et al. |
| 6,735,572 B2 | 5/2004 | Landesmann |
| 6,766,302 B2 | 7/2004 | Bach |
| 6,785,661 B1 | 8/2004 | Mandler et al. |
| 6,795,812 B1 | 9/2004 | Lent et al. |
| 6,847,942 B1 | 1/2005 | Land et al. |
| 6,868,395 B1 | 3/2005 | Szlam et al. |
| 6,895,388 B1 | 5/2005 | Smith |
| 6,898,570 B1 | 5/2005 | Tedesco et al. |
| 6,915,271 B1 | 7/2005 | Meyer et al. |
| 6,928,412 B2 | 8/2005 | DeBiasse |
| 6,934,692 B1 | 8/2005 | Duncan |
| 6,950,807 B2 | 9/2005 | Brock |
| 6,957,192 B1 | 10/2005 | Peth |
| 6,970,852 B1 | 11/2005 | Sendo et al. |
| 6,988,085 B2 | 1/2006 | Hedy |
| 7,010,508 B1 | 3/2006 | Lockwood |
| 7,013,289 B2 | 3/2006 | Horn et al. |
| 7,047,219 B1 | 5/2006 | Martin et al. |
| 7,069,234 B1 | 6/2006 | Cornelius et al. |
| 7,082,412 B1 | 7/2006 | Treider et al. |
| 7,096,354 B2 | 8/2006 | Wheeler et al. |
| 7,103,568 B1 | 9/2006 | Fusz et al. |
| 7,133,935 B2 | 11/2006 | Hedy |
| 7,143,063 B2 | 11/2006 | Lent et al. |
| 7,165,051 B2 | 1/2007 | Ronning et al. |
| 7,171,371 B2 | 1/2007 | Goldstein |
| 7,181,427 B1 | 2/2007 | DeFrancesco et al. |
| 7,194,436 B2 | 3/2007 | Tammaro |
| 7,219,080 B1 | 5/2007 | Wagoner et al. |
| 7,249,097 B2 | 7/2007 | Hutchison et al. |
| 7,289,964 B1 | 10/2007 | Bowman-Amuah |
| 7,310,617 B1 | 12/2007 | Cunningham |
| 7,353,192 B1 | 4/2008 | Ellis et al. |
| 7,363,267 B1 | 4/2008 | Vincent et al. |
| 7,376,603 B1 | 5/2008 | Mayr et al. |
| 7,395,259 B2 | 7/2008 | Bailey et al. |
| 7,505,939 B2 | 3/2009 | Lent et al. |
| 7,539,628 B2 | 5/2009 | Bennett et al. |
| 7,542,922 B2 | 6/2009 | Bennett et al. |
| 7,610,221 B2 | 10/2009 | Cella et al. |
| 7,627,531 B2 | 12/2009 | Breck et al. |
| 7,630,986 B1 | 12/2009 | Herz et al. |
| 7,660,751 B2 | 2/2010 | Cella et al. |
| 7,660,752 B2 | 2/2010 | Cella et al. |
| 7,729,959 B1 | 6/2010 | Wells et al. |
| 7,742,966 B2 | 6/2010 | Erlanger |
| 7,769,681 B2 | 8/2010 | Misraje et al. |
| 7,908,226 B2 | 3/2011 | Hutchison et al. |
| 7,938,316 B2 | 5/2011 | Bennett et al. |
| 7,942,316 B2 | 5/2011 | Bennett et al. |
| 8,036,941 B2 | 10/2011 | Bennett et al. |
| 8,117,120 B2 | 2/2012 | Misraje et al. |
| 8,135,575 B1 * | 3/2012 | Dean ................................ 704/7 |
| 8,145,563 B2 | 3/2012 | Misraje et al. |
| 8,177,124 B2 | 5/2012 | Bennett et al. |
| 8,181,851 B2 | 5/2012 | Bennett et al. |
| 2002/0052778 A1 | 5/2002 | Murphy |
| 2005/0262440 A1 * | 11/2005 | Stanciu et al. ................. 715/523 |
| 2008/0126077 A1 * | 5/2008 | Thorn .............................. 704/8 |
| 2009/0024595 A1 * | 1/2009 | Chen ................................ 707/4 |

\* cited by examiner

Search Engine's Web Page (www.Search_Engine.com) 721

SEARCH ENGINE.COM 741

| Home | About | Contact Us | FAQ 751 |

Source Language: 743 → 745    Destination Language: 747 → 749

[English]    [Hindi]

Enter Search String: 723  [Drywall 725]   727   [Search] 739

○ Enable International Terms Support 729   ○ Enable Thesaurus 733   ⦿ Enable Translation 735

Search Results in English Language: 755
1. www.plasterwood.com 751
2. American Drywall 752

Search Results in English (Translated from Hindi): 757
1. www.gypsum.com 761
2.

[Prev] 785   [Next] 789

Note: Enabling "International Terms Support" provides International Web Pages, enabling "Translation" provides Translated International Web Pages. 793

Client's Browser 795

Done

FIG. 7

SUPPORT FOR INTERNATIONAL SEARCH TERMS—TRANSLATE AS YOU CRAWL

CROSS REFERENCE TO RELATED APPLICATIONS

The present application is a continuation of U.S. Ser. No. 12/437,611, filed May 8, 2009, and now issued as U.S. Pat. No. 8,250,083, which claims priority under 35 U.S.C. 119(e) to U.S. Provisional Application Ser. No. 61/053,712, filed May 16, 2008, both of which are incorporated herein by reference in their entirety for all purposes.

BACKGROUND

1. Technical Field

The present invention relates generally to Internet infrastructures; and, more particularly, to search engines.

2. Related Art

A user, through direct and explicit knowledge, may know the addresses of only handful of web pages that provide relevant information. In the absence of such knowledge of the direct addresses of websites that would provide relevant information, the user typically resorts to search engines to find web pages related to business, commercial, scientific, shopping, other professional or home needs, and other uses. The user may use search engines for a wide variety of purposes such as shopping, seeking further information about professional needs (such as business and scientific needs), entertainment, downloading useful files, streaming video, etc.

However, search engines today have many shortcomings that limit the user's ability to search for information. One of these shortcomings is that when the user is in a foreign land where the spoken language(s) are different from what the user is familiar with, the search engines provide web page information in the local language and the user is not able to understand the information in these web pages. For example when an American visits Germany, and looks for hospital information for a health related issue, search engines may provide relevant information, but only in German language. Therefore, this information is unhelpful to the user.

In other circumstances, the search engines may provide web pages with some information in the native language of the user, but often the interpretations of these words are incorrect or out-of-date due to lack of real-time support. This confusion may also happen or be exacerbated if the search string provided has multiple meanings or translations in the local language. Some search engines provide translations of web pages, but these translations are not exact and do not provide clear information that correlates well to the information originally written in the original language. The user cannot search if he/she knows of no search terms in a local language in a new city and/or that infrastructure does not support translation and/or searching in the user's foreign language. For example, the user may be in a foreign land searching for panels for outside of a house (that is, exterior wall covering or exterior paneling) or local restaurants, or for local news. For a non-English speaker, the entire searching process becomes difficult if not impossible. Therefore, a need exists for a more internationally compatible and friendly Internet infrastructure that accommodates international and multi-language searching, content, translation, and processing.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 7 is a snap shot or screen shot of a search result page containing web links of web pages in accordance with the embodiment of FIG. 1;

DETAILED DESCRIPTION OF THE DRAWINGS

Figure 1:
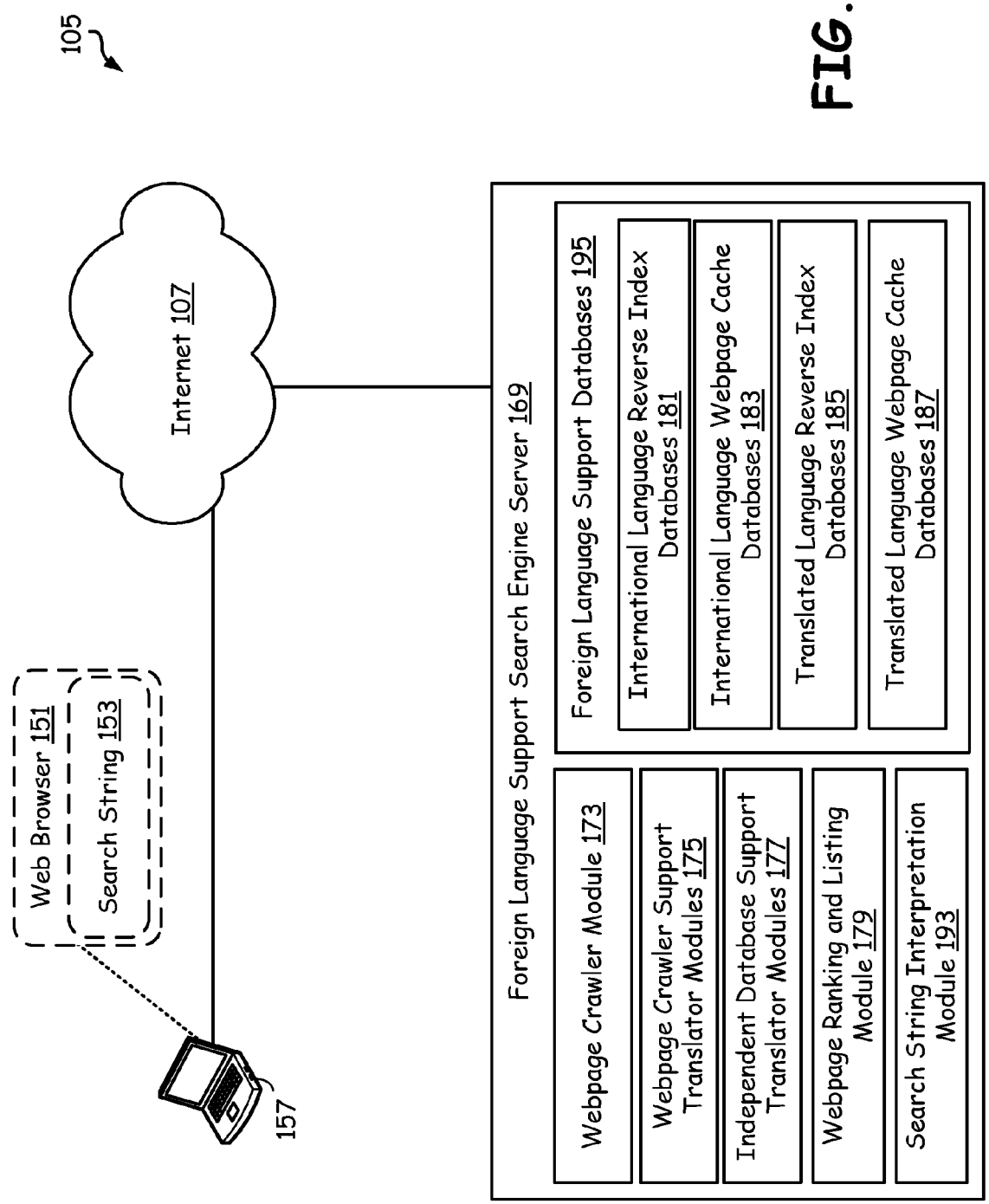
FIG. 1 is a schematic block diagram illustrating an Internet infrastructure containing a client device and web-browser-accessible foreign language support search engine server.

FIG. 1 is a schematic block diagram illustrating an Internet infrastructure 105 containing a client device 157 and (web browser accessible) foreign language support search engine server 169 connected via the Internet 107. The foreign language support search engine server 169 identifies new web pages in a source/original language by crawling servers on the Internet 107, translates the web pages from the source/original language into a plurality of destination languages, creates reverse indexes in respective languages, stores both reverse indexes and cache web pages in a database, and delivers selected translated web pages to the web browser in the source and/or destination language upon inquiry.

In specific, the foreign language support search engine server 169 gathers new or changed web pages in plurality of supported major languages by crawling from one server, database, or web page to another and translates these new web pages from a source/original language to the rest of the supported major languages (destination languages) that the system is set to manage. The system then stores the supported major language translations in respective destination language cache databases. Since Internet content is continually changing, the crawling and translation of web content and pages is often a full time job for one or more servers or CPUs. Therefore, these translated pages must be updated on a fairly routine or continuous basis to remain current.

In another embodiment, the source web pages or servers can ping, interrupt, or notify the server 169 that it has made changes whereby the server 169 can remain current with consumption of less bandwidth and less consumed process time/power committed to updated or checking content that is static and unchanging over long periods of time. Such functionality may be accomplished by downloading an application from the foreign language support search engine server 169 to a server upon which translation has been performed. The foreign language support search engine server 169 also creates reverse indexes for these destination language databases and stores them in a separate destination language reverse index database or databases. These databases may physically be a single database, may only conceptually differ from one another or, in another embodiment, the databases may also be distributed in different locations around the world. In other words, the foreign language support search engine server 169 may be implemented as server clusters or cloud computing distributed in various physical locations over the Internet. This may also allow the databases to focus on only those languages that a have high interest in the local regions.

A search string 153 is entered from a web browser 151 or another client application of the client device 157 in one of the supported major languages (source language). Upon this event, the foreign language support search engine server 169 determines the search string language by either searching through conjugate terms databases (which contains all of the terms and strings in various supported major languages along with meanings or synonyms in rest of the supported major languages), by performing optical character recognition or spatial/pattern recognition on the text, or by identifying the domain name of the search engine query web page. Once the source language is identified, the foreign language support search engine server 169 determines the relevance of the web pages to the search string 153 in various languages by searching through the reverse index databases in all of the supported major languages. The server then selects web links that are pertinent to the search string 153 in all of the supported major languages and delivers both source language web links (typically, in one of the windows in a search result page) and web links in the rest (or some pre-selected one or more target languages) of the relevant supported major languages (in a second window or a segmented interface). That is, the second window may display web links from one or more of the destination languages translated to the source language, and the languages displayed for perusing may be all the supported language, the target language of the search string, or a plurality of target languages selected by the user in the browser interface or the control panel of the client device 157. The web links in the second window may be coded so that they do not vector to the actual web pages in their respective servers, but they vector to the cached web pages of the source language cache databases properly translated (if required) by the foreign language support search engine server 169. Upon clicking on these web links (in the second window), the foreign language support search engine server 169 delivers web pages from the desired language cache databases, and these stored web pages are already translated to the desired language.

For example, a search string 153 provided in the English language, that is entered in Germany, typically provides web links that vector to web pages in the German language alone. However, the foreign language support search engine server 169, upon receiving a search string 153 in English provides not only the relevant web links of the English web sites, but also web links that vector to the foreign language support search engine server's 169 translated English language web page cache database (which among them contains the plurality of German web pages translated to English in the second window. Alternatively, a single window may also display search results in the English language mixed with translated German language web pages. And, as already discussed, the user may ask for the German pages to be provided in one or more of English, French, and Spanish (i.e., multiple other foreign languages).

In another embodiment, the foreign language support search engine server 169 provides real time translation support specifically while dealing with languages other than the supported major languages (such as ones that have few users where it is not cost effective to provide database support) or while working with dynamic web pages (whose contents change frequently). Therefore, translation support may be performed before a user access with the page(s) cached for prompt response to a user request. The system may cache or retain content in an untranslated original state and only translate for presentation to a user that content and those languages that are requested by the user. The second operation may provide a solution that uses less computational bandwidth, Internet bandwidth, and processing power/memory, whereas the first solution may improve the latency of providing meaningful data to the user in a timely manner. In some cases, a hybrid of the two approaches may work the best. In the case or real time translation processing, the foreign language support search engine server 169 translates the web pages of destination languages in real time and delivers translated pages to the web browser 151 (refer to the FIG. 2 for detailed description of real time translation services).

To store all of the source language web pages and respective translated web pages in other (destination) major languages and their reverse indexes (for quick search response), the foreign language support search engine server 169 contains a plurality of databases (which may conceptually be separate, but physically may be in a single database or even distributed among plurality of servers—server clusters—worldwide) via a foreign language support databases 195. The foreign language support databases 195 in turn contain a plurality of conceptually distributed databases such as international language reverse index databases 181, international language web page cache databases 183, translated language reverse index databases 185 and translated language web page cache databases 187. For example, the international language reverse index databases 181 and international language web page cache databases 183 may contain reverse indexes (containing search terms—or strings or phrases—and relevant web links linked to these terms) and cache web pages (frozen web pages at the time of crawling and identifying new web pages), respectively, in all of the supported major languages, such as English, German, French, Spanish, Chinese and Hindi. These databases 181 and 183 contain web pages that are retrieved from the respective servers without any alterations or translations. Similarly, translated language reverse index databases 185 and translated language web page cache databases 187 may contain reverse indexes and cache web pages, respectively, in all of the supported major languages other than the source language. For example, for every English language web page available in one of the international language web page cache databases 183, the translated language web page cache databases 187 may contain in their respective destination language databases translated cache web pages in German, French, and Spanish; Chinese and Hindi (refer to FIG. 3 for detailed description of this functionality using the databases).

In addition to the databases, the foreign language support search engine server 169 contains a plurality of translators that translate web pages from their source languages to one/more/all other supported major languages (i.e., destination languages) and stores them in the respective translated language reverse index databases 185 and translated language web page cache databases 187. The plurality of translators includes two or more different types (in different embodiments of the present invention or used together). In FIG. 1, two specific different types of translators are specifically shown, that is, web page crawler support translator modules 175 and independent database support translator modules 177. The web page crawler support translator modules 175 in turn contain a plurality of translators that translate a web page, in a source language (i.e., one of the major languages that are supported by the system), identified by a web page crawler module 173 during crawling operations, to a plurality of other languages (destination languages, all of the languages in the supported major languages other than the source language in one embodiment) and stores them in the respective translated language web page cache databases 187 and then, creates reverse indexes for each of these cache databases 187 and stores them in the respective translated language reverse index databases 185. In another embodiment, translation may only occur on an as needed basis and may be temporarily cached to save translation processing on content this is hit often. Therefore, the translation process, as already discussed, can be real-time while web pages are requested or may be preformed off-line in the background so all content is translated and waiting once requested in a certain language by the user.

Returning to the example of FIG. 1, a vector to an English language web page is identified by the web page crawler module 173 and is supplied to the web page crawler support translator modules 175. Modules 175, in turn, retrieve the English language web page and translate them into plurality of other supported major languages such as German, French, Spanish, Chinese and Hindi. Such languages may differ in different servers around the planet, as different regions will obviously favor different languages. In all, if there are four supported major languages, for example, then twelve translators are employed to perform translations into rest of the supported major languages. Therefore, the web page crawler support translator modules 175 may contain twelve translators, in this case, to support all language combinations. In other embodiments, use cases may indicate that translations between language one and language three are common whereby translations from language two to language four are uncommon or never requested. In these cases, some of the twelve (or whichever number) of combinations may be eliminated as the local use case allows.

Figure 4:
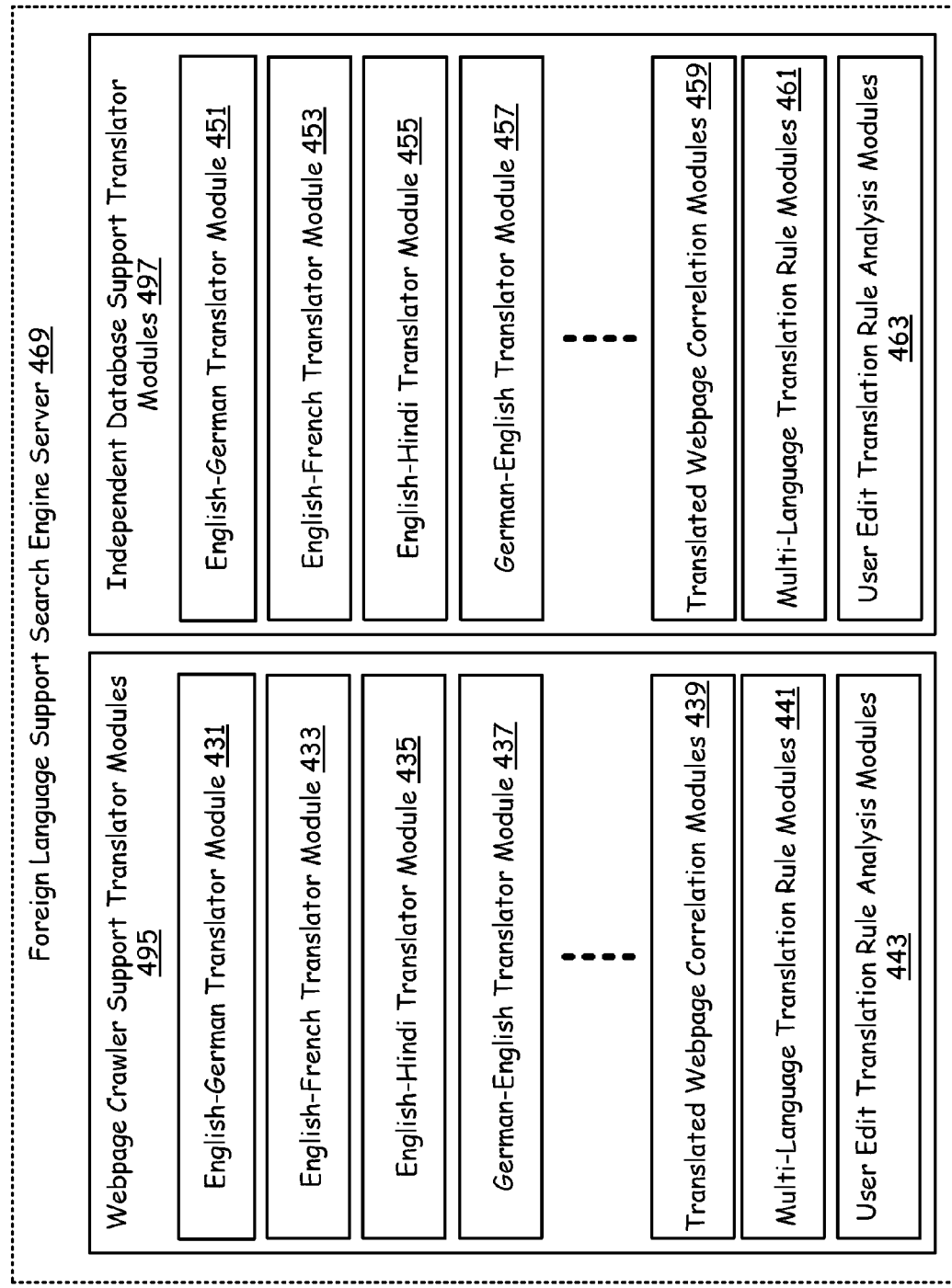
FIG. 4 is a schematic block diagram illustrating in more detail the web crawler support translator modules and independent database support translator modules of FIG. 1.

Similarly, the independent database support translator modules 177 performs translations from a source language into the rest of the supported major languages, in another embodiment of the present invention, by accessing web pages from the international language web page cache databases 183 and translated language web page cache databases 187 directly. In other words, these translators 177 do not link to web page crawler module 173, on the contrary, the translators 177 access web pages directly from cache databases 183 and 187. Again, if there are four supported major languages, for example, then the independent database support translator modules 177 may contain up to translators, to perform translations into rest of the supported major languages. Refer to FIG. 4 and its corresponding text for a detailed description of the web page crawler support translator modules 175 and independent database support translator modules 177).

To perform other search-operation-related functionalities, the foreign language support search engine server 169 contains web page ranking and listing module 179 and search string interpretation module 193. The search string interpretation module 193 receives a search string 153 in a source language and determines its language by looking into the conjugate terms databases (not shown, refer to the FIG. 3 for detailed description of conjugate terms databases) and then retrieves conjugate source language terms, and may even facilitate translations as needed to render the search string compatible with the searchable content languages. The conjugate terms databases contain strings and terms from all of the supported major languages in one column along with a language tag in another column and a plurality of corresponding conjugate destination language strings and terms in a series of succeeding columns. In other embodiments, other data constructs can be used and will still be effective. The conjugate destination language strings and terms are retrieved when an 'enable international terms support' button is enabled in a search interface page of the foreign language support search engine server 169, otherwise the same search strings or terms are used to conduct searching. The client device 157 illustrated in FIG. 1 is communicatively coupled to the foreign language support search engine server 169 via an Internet 107.

An 'enable thesaurus' button provided in the search interface page of the foreign language support search engine server 169 and accessible via web browser 151 may be individually enabled or may be enabled along with the 'enable international terms support' button. If the 'enable thesaurus' button is individually enabled, then various synonyms of the search string are utilized for more comprehensive searching. Alternatively, if the 'enable thesaurus' button is enabled along with the 'enable international terms support' button, then the process of retrieving conjugate destination language strings or terms (mentioned in the above paragraphs) is accompanied by retrieving synonyms for the conjugate source language strings or terms from a thesaurus database (not shown specifically in FIG. 1). This process of determining synonyms broadens the scope of search since exact translations in destination languages may not be available for the search string 153. Once conjugate destination language strings and terms and their synonyms are retrieved, they are utilized to select search result web links.

For example, if a user (who understands only English) is in Germany and wants to conduct a search using English terms, the search results are typically returned are German language web pages. Even though translation applications may be locally available on a client for some of the web pages, those translation operations are not exact. In other words, the user often cannot search in Germany if he/she does not use search strings entered in local language in a new city. The foreign language support search engine server 169, in accordance with the teachings herein, allows the user to search using an English search string 153 (that is using words in a source language) by enabling 'enable international terms support' and/or 'enable thesaurus' buttons, and provides web links that vector to both English language web pages in their respective Internet servers and relevant German language web pages that are translated to English and are located in translated German language web page cache database (of translated language webpage cache databases 187). Thus, for example, if the user is searching for hospitals in Germany, he/she may receive web links that provide local hospital information in English (by vectoring the web links to the translated original German web pages in the translated language web page cache databases 187).

Figure 2:
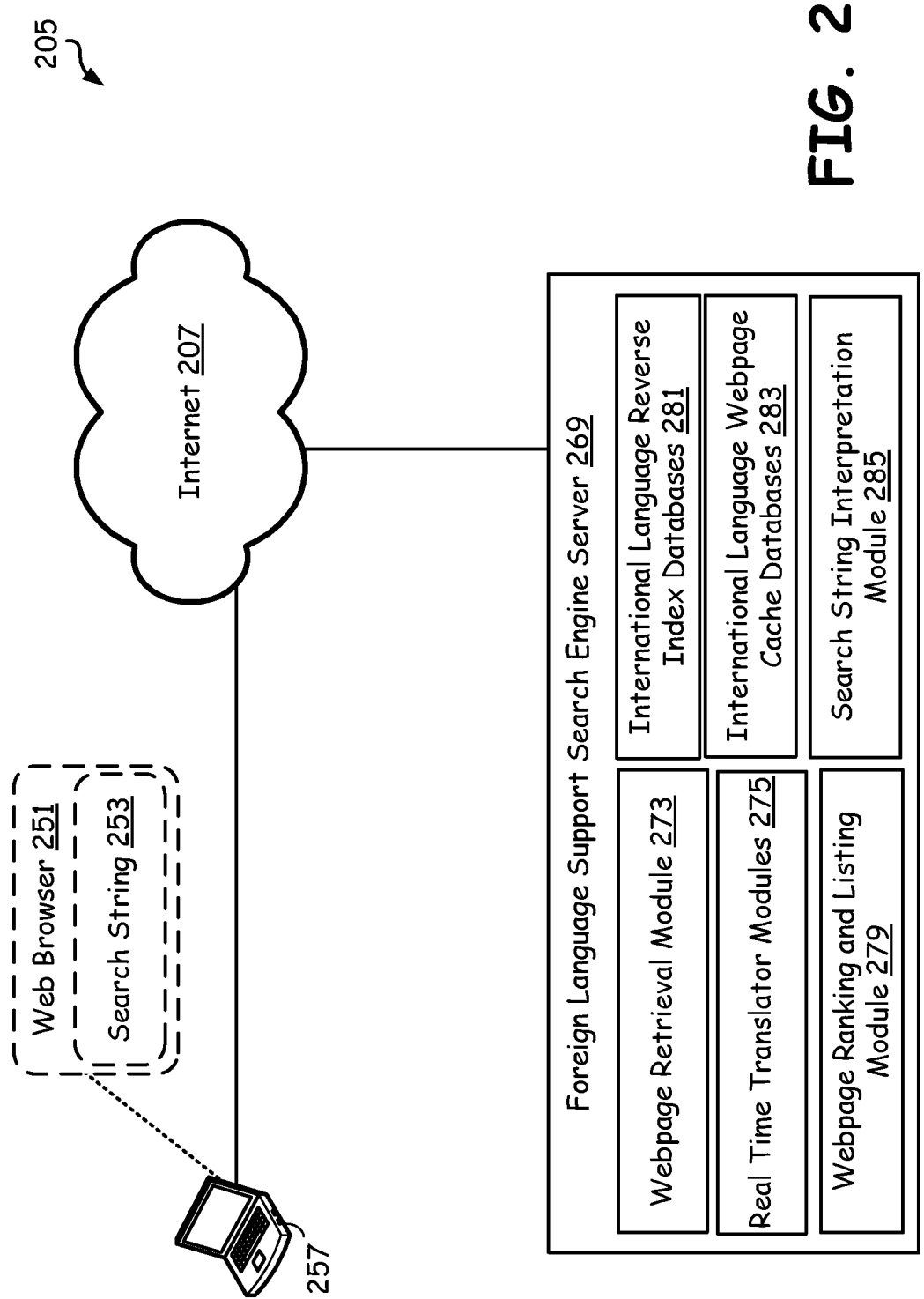
FIG. 2 is a schematic block diagram illustrating an Internet infrastructure, in continuation of FIG. 1, wherein the foreign language support search engine server translates selected web pages upon an inquiry in real time and delivers them to the web browser in a desired language upon inquiry.

FIG. 2 is a schematic block diagram illustrating an Internet infrastructure 205, in continuation of FIG. 1, wherein the foreign language support search engine server 269 (similar to the server 169 of FIG. 1) translates selected web pages upon inquiry in real time and delivers them to the web browser 251 (similar to the browser 151 of FIG. 1) in a source language upon inquiry. Specifically, the foreign language support search engine server 269 identifies the source language of the search string 253 (upon inquiry in a source language via the web browser 251 on the client device 257, in a search interface page on a screen of the client device 257) and then selects and delivers web links of web pages in relevant source and destination languages derived from reverse index databases and cache databases and translates the relevant web content in real time upon clicking on the web links in the search result pages and delivers these translated web pages to the web browser 251 via the Internet 207 (similar or identical to the Internet 107 of FIG. 1). The real time translation may occur on web pages of many destination languages that include supported major languages as well as other minor languages that have few users (where it is often not cost effective to provide database support) and dynamic web pages (whose contents change frequently). In these cases, the foreign language support search engine server 269 translates these web pages of destination languages in real time and delivers them to the web browser 151. The translation occurs in real time upon clicking on the web links delivered in the search results pages. Therefore, a hybrid approach involving cached or database-stored pre-access translation and real-time translation on an as-needed basis for other content can be employed.

The foreign language support search engine server 269 utilizes reverse indexes of the source languages that are stored in international language reverse index databases 281 to select web links upon inquiry. These databases 281 may physically be a single database, may only conceptually differ from one another, or the databases may also be distributed in different locations around the world to enable cloud computing or peer-to-peer systems. In other words, the foreign language support search engine server 269 may be implemented as server clusters distributed in various physical locations.

The foreign language support search engine server 269 determines the language of the search string 253 in one of the supported major languages (source language) or other minor languages by either searching through conjugate terms databases (which contains all of the terms and strings in various supported major languages and other languages along with meanings or synonyms in rest of the supported major languages), by pattern/spatial/character recognition, and/or by identifying the domain name of the search interface page. Once the source language is identified, the foreign language support search engine server 269 determines the relevance of the web pages (to the search string 253) in various languages by searching through the international language reverse index databases 281 and selects web links that are pertinent to the search string 253 and delivers these web links (typically, in multiple windows, via a search result page). Upon clicking on these web links (in a window that contains web links of web pages in languages other than source language), the foreign language support search engine server 269 delivers real-time translated web pages from international language web page cache databases 283 or may provide cached pre-translated pages from other transactions for high traffic content on the Internet 207.

To store all of the source language web pages in supported major languages and other minor languages and their reverse indexes (for quick search response), the foreign language support search engine server 269 contains a plurality of databases (which may conceptually be separate, but physically may be in a single database or even distributed among plurality of servers—server clusters—worldwide), under the access and control of the international language reverse index databases 281 and international language web page cache databases 283. For example, the international language reverse index databases 281 and international language web page cache databases 283 may contain reverse indexes (containing search terms—or strings or phrases—and relevant web links linked to these terms) and cached web pages (frozen web pages at the time of crawling), respectively, in all of the supported major languages and other languages, such as English, German, French, Spanish, Chinese, Hindi (supported major languages) and Swahili, Vietnamese, Czechoslovakian languages (other languages having much lesser number of users). These databases 281 and 283 contain web pages that are retrieved, by a web page retrieval module 273, from the respective servers without any alterations or translations.

In addition to databases, the foreign language support search engine server 269 contains a plurality of translators that translate web pages in real time (though, possibly, at some cost of time of response and accuracy of translation) from their source languages to the language of inquiry and delivers them upon clicking on the web links, via real time translator modules 275. If there are four supported major languages and other minor languages, for example, then up to twelve real time translators are employed to perform all relevant translations. Therefore, the real time translator modules 275 may contain twelve translators, in this case.

To perform other search operation related functionalities, the foreign language support search engine server 269 contains web page ranking and listing module 279 and search string interpretation module 285. The search string interpretation module 285 receives a search string 253 in a source/search language and determines its language by looking into the conjugate terms databases (not shown, refer to the FIG. 3 for detailed description of conjugate terms databases) and then retrieves conjugate source language terms from memory/storage. The conjugate terms databases contain strings and terms from all of the supported major languages in one column along with a language tag in another column and a plurality of corresponding conjugate destination language strings and terms in a series of succeeding columns. Other data structures and methods can also be used to store this information in a manner suitable for use herein. The client device 257 illustrated in FIG. 2 is communicatively coupled to the foreign language support search engine server 269 via an Internet 207.

As an example of the operation of FIG. 2, if a user (who understands only the Czech language, which is not one of the supported major languages and has only few users) were to be in Germany and were to conduct a search using Czech language terms, what typically comes back are web links of German web pages. The foreign language support search engine server 269, in accordance with the teachings herein and in these cases, will allow the user to search using an Czech language search string 253 (that is using words in a source language) by enabling 'enable international terms support'. The system then provides web links that vector to Czech language web pages in their respective Internet servers and that vector to relevant German language web pages available in the international language web page cache databases 283. Thus, for example, if the user is searching for travel agents in Germany or Czech Republic, he/she may receive web links that provide information about German and Czech Republic travel agents in Czech language. When the user clicks on the web links (of travel agents in German language), the foreign language support search engine server 269 delivers real time translated web pages from, for example, a Czech language web page cache database (one of the international language web page cache databases 283).

Figure 3:
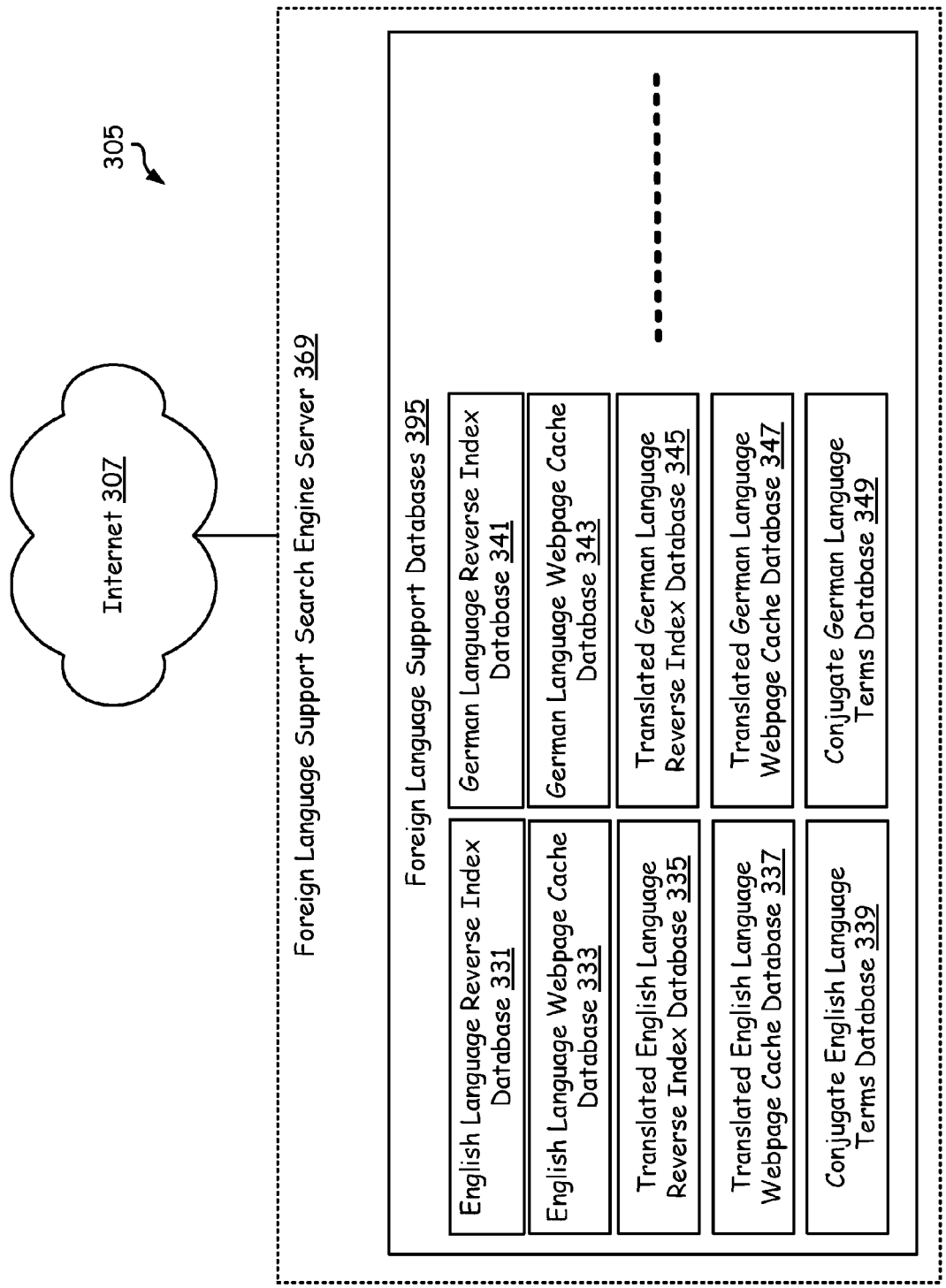
FIG. 3 is a schematic block diagram illustrating foreign language support databases of FIG. 1 in detail.

FIG. 3 is a schematic block diagram 305 illustrating foreign language support databases 395 of FIG. 1, in detail. Specifically, the foreign language support search engine server 369 contains a plurality of databases to store all of the source language web pages and respective translated web pages in the destination major languages along with their reverse indexes (for quick search response), using the foreign language support databases 395. The foreign language support databases 395 in turn contain a plurality of conceptually distributed databases in various languages. For example, as pertaining to English language, a typical source language, the foreign language support databases 395 may contain databases such as English language reverse index database 331, English language web page cache database 333, translated English language reverse index databases 335, translated English language web page cache database 337 and conjugate English language terms database 339. The conjugate English language terms database 339 contain strings and terms from English language in one column or database construct along with a language tag and a plurality of corresponding conjugate destination language strings and terms in a series of succeeding columns or different database constructs. The foreign language support search engine server 369 is communicatively coupled to Internet 307 in FIG. 3.

As an example of the operation of FIG. 3, the English language reverse index database 331 and English language web page cache databases 333 may contain reverse indexes (containing English search terms—or strings or phrases—and relevant web links of English web pages linked to these terms) and cache web pages (frozen English web pages at the time of crawling and identifying new web pages), respectively. These databases 331 and 333 contain English web pages that are retrieved from the respective servers without any alterations or translations. Similarly, translated English language reverse index database 335 and translated English language web page cache database 337 may contain reverse indexes and cache web pages translated to English from all of the other supported major languages other than the English language.

Similarly, the foreign language support databases 395 may contain a plurality of databases in various other languages such as German, by using the German language reverse index database 341, German language web page cache database 343, translated German language reverse index databases 345, translated German language web page cache database 347 and conjugate German language terms database 339, as well as in rest of the supported major languages such as French, Spanish, Chinese and Hindi (supported major languages) and other languages having much lesser number of users such as Swahili, Vietnamese and Czech languages. Therefore, FIG. 3 illustrates the kind of software, databases, and information is needed per language and per system in order to enable the language translation taught herein. And, as already noted, these databases and software may be distributed among clients, other servers, and other devices/storage/memory over the Internet.

FIG. 4 is a schematic block diagram 405 illustrating web crawler support translator modules 495 and the independent database support translator modules 497 (similar to modules 175 and 177 of FIG. 1) in greater detail. The foreign language support search engine server 469 (similar to server 169 of FIG. 1) contains a plurality of translators that translate web pages from their source languages to all other supported major languages (i.e., destination or target languages) and stores them in the respective translated language reverse index databases and translated language web page cache databases (not shown, but refer to FIG. 3 for detailed descriptions of these elements). The plurality of translators belongs to two different categories. A first category being web page crawler support translator modules 495 and a second category being independent database support translator modules 497. In other embodiments, fewer or more translator constructs may be present in FIG. 4.

The web page crawler support translator modules 495 in turn contain a plurality of translators that translate a new web page from a source or original language (i.e., one of the supported major languages), that is identified by a web page crawler module (not shown) during crawling operations, to a plurality of other languages (destination languages, all of the languages in the supported major languages other than the source language). The modules 495 store the translations and related data in the respective translated language web page cache databases (not shown in FIG. 4, but preferably a part of the local storage discussed in FIG. 6) and then, creates reverse indexes for each of these cache databases (not shown in FIG. 4, but usually part of system storage/memory) and stores them in the respective translated language reverse index databases (not shown in FIG. 4).

In all, if there are four supported major languages, for example, then up to twelve translators are employed to perform translations into rest of the supported major languages. Other translators may be employed if a dialect has many different versions. An example may be that English may have different translations if the target region is England, versus the US, versus Australia. Therefore, the web page crawler support translator modules 495 may contain twelve translators, in this case, or more or fewer translators if other language or dialect versions are supported. The web page crawler support translator modules 495, for example, may contain English-German translator module 431, English-French translator module 433, English-Hindi translator module 435 (and so on, covering all other supported major languages, that is, English to all other major languages translator modules) and then, German-English translator modules 437 (and again covering all other supported major languages, that is, German to all other major languages translator modules).

In addition, there are other modules in the web page crawler support translator modules 495 that assist the plurality of translator modules such 431, 433, 435, and 437. These include translated web page correlation modules 439, multi-language translation rule modules 441, and user edit translation rule analysis modules 443. The user edit translation rule analysis modules 443 allow users who receive various translated web pages to correct or modify them as they think necessary to extract proper meanings from translated sentences in a given context. The translated web page correlation modules 439 compare the web pages translated by translator modules such as 431, 433, 435 and 437 with the source web pages by utilizing many inputs such as the ones obtained by the user modifications and corrections and then arrive at rules or augmented processes that would be employed by the translator modules such as 431, 433, 435 and 437 in all future translations. All of the translations done by the translator modules such as 431, 433, 435, and 437 are assisted and governed by the multi-language translation rule modules 441. Therefore, with the modules 439, 441, and 443, the system can self correct over time or learn in an artificial intelligence manner, by employing the collective feedback of millions of users and other insight over time. This feedback could also be reviewed by IT professionally that run the server 469 to ensure that the translations are not being sabotaged or virally infected in an adverse manner.

Figure 6:
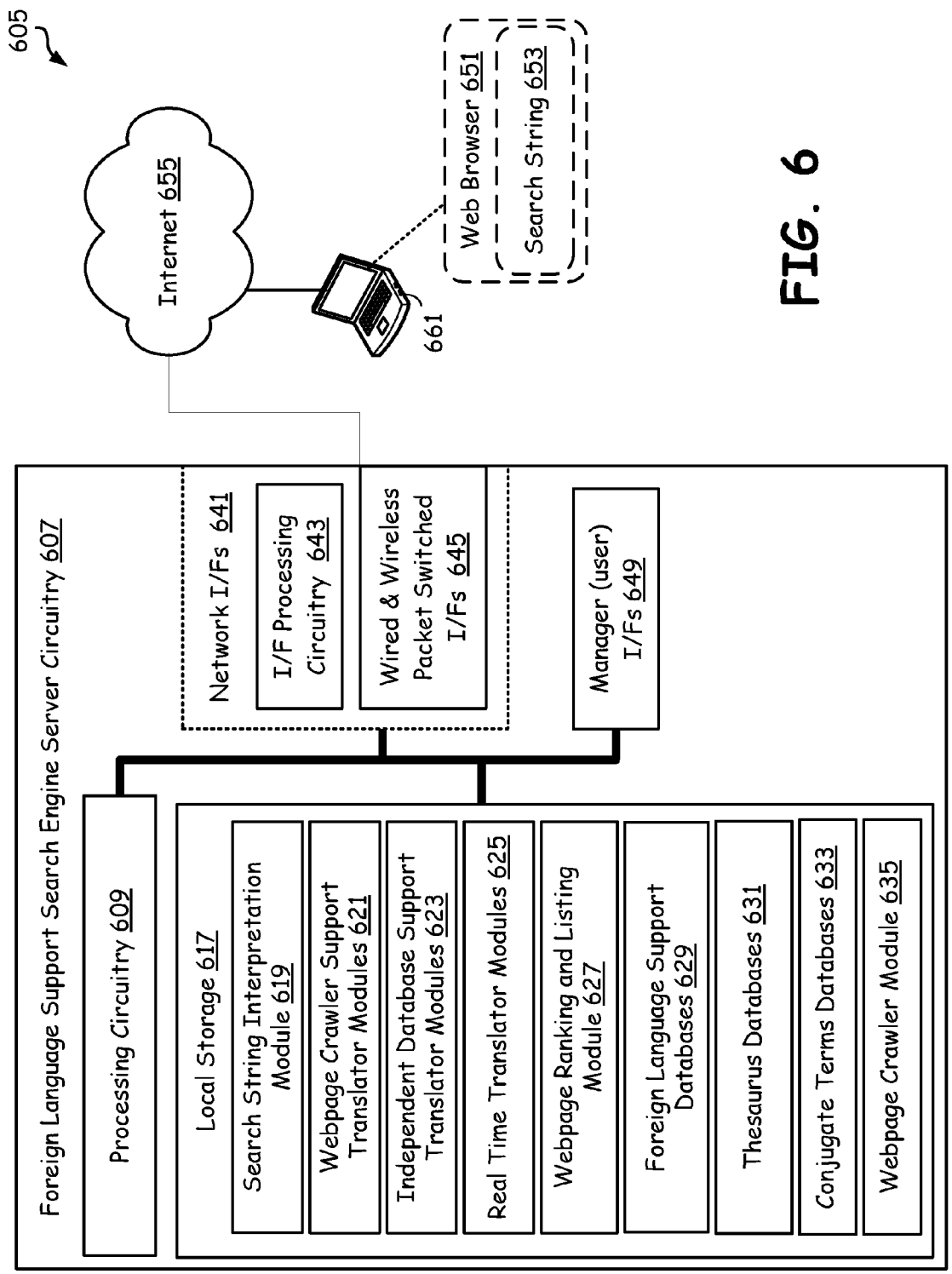
FIG. 6 is a schematic block diagram illustrating components of the foreign language support search engine server constructed in accordance with the embodiments of FIG. 1 and FIG. 2 of the present invention.

Similarly, the independent database support translator modules 497 perform translations from a source language into the rest of the supported major languages (i.e., destination or target languages), by accessing web pages from the international language web page cache databases (not shown, but usually resident in server storage/memory) and translated language web page cache databases (not shown, but usually resident in server storage/memory, see FIG. 6) directly. In other words, these translators 497 access web pages directly from cache databases and translate them as necessary. Again, if there are four supported major languages, for example, then the independent database support translator modules 497 may contain up to twelve translators, to perform translations into rest of the supported major languages.

The independent database support translator modules 497, for example, may contain English-German translator module 451, English-French translator module 453, English-Hindi translator module 455 (and so on, covering all other supported major languages, that is, English to all other major languages translator modules) and then, German-English translator modules 457 (and ongoing again to cover all other supported major languages, that is, German to all other major languages translator modules).

In addition, there are other modules in the independent database support translator modules 497 that assist the plurality of translator modules such 451, 453, 455, and 457. These include translated web page correlation modules 459, multi-language translation rule modules 461, and user edit translation rule analysis modules 463. These modules 459, 461 and 463 function in analogous manner to that of modules 439, 441, and 443 mentioned in the above paragraphs for FIG. 4.

Figure 5:
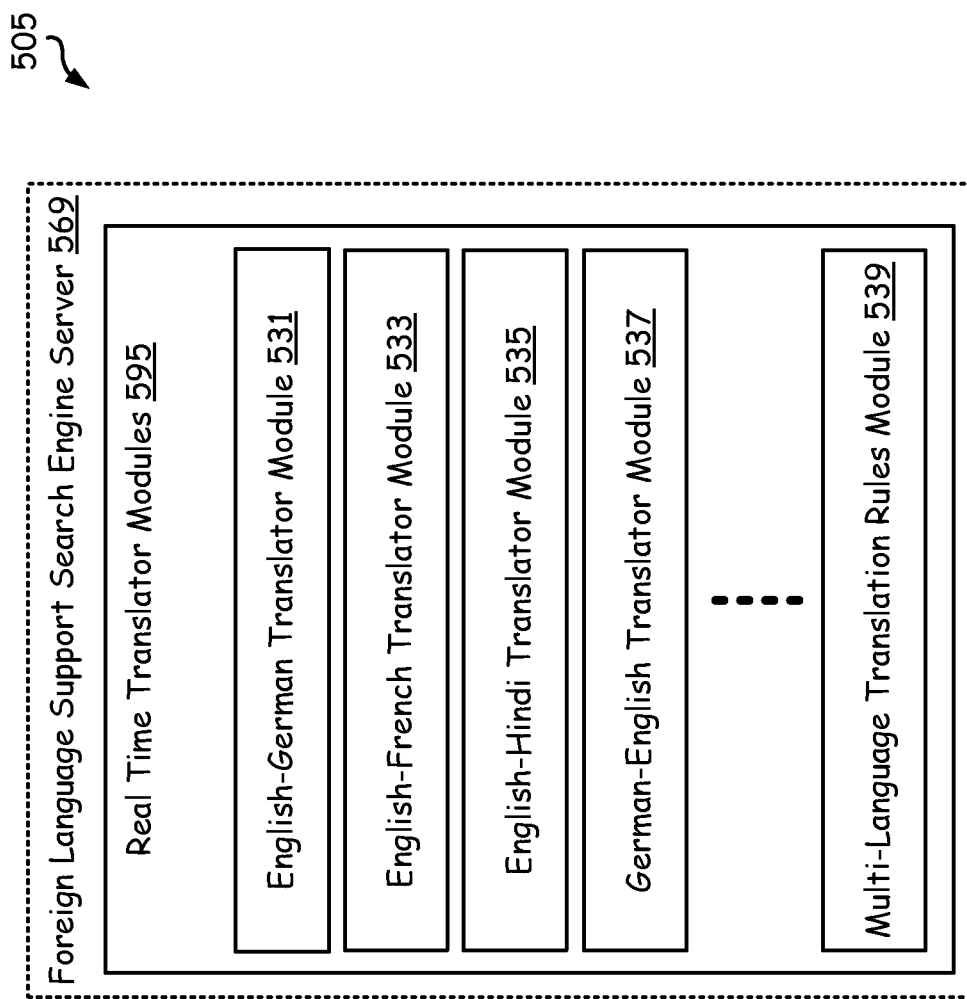
FIG. 5 is a schematic block diagram illustrating in more detail the real time translator modules of FIG. 2.

FIG. 5 is a schematic block diagram 505 illustrating real time translator modules 569 of FIG. 2, in more detail. The foreign language support search engine server 569 (analogous to the server 169 of FIG. 1) contains a plurality of real time translator modules 595 that translate web pages in real time from their source languages to all other supported major languages and other minor languages (i.e., the destination or target languages) and deliver them to the web browsers (see FIGS. 1-2) upon inquiry and request. In all, if there are four supported major languages and other minor languages, for example, then up to twelve real time translators are employed to perform translations into one of the supported major languages or other minor destination languages. Therefore, the foreign language support search engine server 569 may contain twelve translators, in this case. The foreign language support search engine server 569, for example, may contain English-German translator module 531, English-French translator module 533, English-Hindi translator module 535 (and so on, covering all other supported major languages, that is, English to all other major languages translator modules) and then, German-English translator modules 537 (and again covering all other supported major languages, that is, German to all other major languages translator modules). These translators 531, 533, 535 and 537 are programmed to function in real time in one embodiment. In another embodiment, the translators can be programmed to function off-line or in a combination of off-line and real-time processing modes. If these modules function in real time, they will operate after the user at a client device receives search results in terms of web links that may also contain some translated web links of languages other than the source language, and clicks upon one of these web links. The translators 531, 533, 535 and 537 receive web pages that belong to languages other than the source language from their respective Internet servers and then, before delivery, they translate this web content to the source language.

In addition, the foreign language support search engine server 569 contains other modules that assist the plurality of real time translator modules such 531, 533, 535, and 537. These include multi-language translation rule modules 539. All of these translations are done by the real time translator modules, such as modules 531, 533, 535 and 537, and are assisted and governed by the multi-language translation rule modules 539. It is important to note that most embodiments herein are discussed in terms of finding web pages in a source language and converting them, either real-time or off-line, to target languages to allow for international use. However, other methods may be used, using the systems taught herein. For example, a server may crawl international sites in other languages and covert those web pages to the original/source language used in the region that is served by the server. For example, a server 169 in the US, could crawl or seek out pages in France and Germany and grab those pages in the local languages and convert them to English and store them in the US so that US users could access content previously only available in Europe and then only available in foreign languages (in this case, German and French). Therefore, the various methods of translating and converting web content to make it more accessible to other users that use other languages can vary, but achieve the same end objective.

FIG. 6 is a schematic block diagram 605 illustrating components of the foreign language support search engine server 607 constructed in accordance with the embodiments of FIG. 1 and FIG. 2 of the present invention. The foreign language support search engine server circuitry 607 may in part or in full be incorporated into any computing device that is capable of serving as an Internet based server or client device. The foreign language support search engine server circuitry 607 generally includes processing circuitry or CPU(s) 609, local storage/memory 617, manager interfaces 649, and network interfaces 641. These components are communicatively coupled to one another via one or more of a system bus, dedicated communication pathways, or other direct or indirect communication pathways as shown in FIG. 6. The processing circuitry or CPU 609 may be, in various embodiments, a microprocessor, a graphics processing unit, a digital signal processor, a state machine, an application specific integrated circuit, a field programming gate array, combinations thereof, multi-core processors, or other processing circuitry.

The network interfaces 641 contain wired, optical, and/or wireless packet switched (or other) interfaces 645 and may also contain built-in or an independent interface processing circuitry or CPU(s) 643. The network interfaces 641 allow the foreign language support search engine server 607 to communicate with client devices, such as client device 661 of FIG. 6 via the Internet 655 and to deliver search result pages and web content in the source language and/or translated language web pages to web browser 651 in FIG. 6. Such searches are initiated via the provision of one or more search strings 653 or search data within the client device 661 of FIG.

6. The manager interfaces 649 may include a display and/or keypad interfaces. These manager interfaces 649 allow the user or IT professional at the foreign language support search engine server 607 to control aspects of the system and its performance/functionality/security. The client device 661 illustrated in FIG. 6 is communicatively coupled to the foreign language support search engine server 607 via the Internet 655, which is analogous to the Internet 107 of FIG. 1.

Local storage/memory 617 may be any type of random access memory, read-only memory, electrically erasable memory, non-volatile memory, flash memory, a disk drive, an optical drive, cache memory, combinations thereof, or another type of memory that is operable to store computer instructions and/or data. The local storage 617 stores software/data to embody a search string interpretation module 619, web page crawler support translator modules 621, independent database support translator modules 623, real time translator modules 625, web page ranking and listing module 627, foreign language support databases 629, thesaurus databases 631, conjugate terms databases 633, and web page crawler module 635. These modules 619, 621, 623, 625, 627, 629, 631, 633, and 635 of FIG. 6 facilitate the interpretation of the search string that may include translation operations, the identification of new web pages in a source language by a crawling process, followed by various translation(s) into a plurality of destination languages, ranking/ordering/rating of web pages that are placed in search result lists as part of a search operation, the creation of reverse indexes in respective languages, the enabling of searching based on search string synonyms or a thesaurus database, the storing of both reverse indexes and cache web pages, and the delivery of selected translated web pages to the web browser in the source language upon inquiry. These operations are discussed in more detail in following paragraphs.

Upon receiving a search string 653 in one of the supported major languages (source language) or other minor languages (a minor source language), the search string interpretation module 619 determines the language of the search string by either searching through the conjugate terms databases 633, via pattern/character/optical/spatial recognition and/or by identifying the domain name of the search engine query web page. Once the source language of the search string is identified, the web page ranking and listing module 627 determines the relevance of the various search results or web links to the search string 653. The search results may belong to various languages and require translation operations or processing by searching through the reverse index databases (contained in the foreign language support databases 629) in all of the supported major languages and other minor languages. Eventually, corresponding web pages are selected and the web page's web links that are pertinent to the search string 653 are delivered in either or both the source language and one or more target or destination languages (vectored to the web pages in the foreign language support databases 629).

The local storage/memory 617 also contains a plurality of translators that translate web pages from their source languages to all other supported major destination/target languages and store them in the foreign language support databases 629. The plurality of translators includes three types of translators (in different combination in different embodiments herein), that is, web page crawler support translator modules 621, independent database support translator modules 623, and real time translator modules 625. The web page crawler support translator modules 621 in turn include a plurality of translators that translate a new web page from a source language identified by a web page crawler module 635 during crawling operations, to a plurality of other destination/target languages and stores them in the foreign language support databases 629 or some other storage/memory construct within the server or over the Internet or other local peripheral bus structures that connect to additional storage. Then, the web page crawler support translator modules 621 creates reverse indexes for each of the cache databases contained in the foreign language support databases 629 and stores them in the respective reverse index databases which are also contained in the foreign language support databases 629.

The independent database support translator modules 623 perform translations from a source language into one or more of the supported major destination or target languages (or some subset thereof selected by the user or designated by the region services by the server) by accessing web pages from the foreign language support databases 629 directly. That is, these independent database support translator modules 623 do not link to web page crawler module 635 in one embodiment, and on the contrary, these modules access web pages directly from the foreign language support databases 629.

The real time translator modules 625 provide real time translation support to the users, specifically while dealing with the other minor languages requirements (e.g., processing in a special manner those languages that have fewer users where it is not cost effective to provide database and continuous support for those minor languages) or while dealing with dynamic web pages (whose contents change frequently). An example of a page that changes frequently is CNN.com where news changes many times over the course of the day. In these cases, the real time translator modules 625 access the requested web pages in the source or destination languages from their respective Internet servers, translates them in real time, and delivers that content to the web browser 651.

In the case of all of these three types of translators 621, 623, and 625, if there are four supported major languages and other minor languages, for example, then the translator modules 621, 623, and 625 may contain up to twelve translators each, to perform translations into the rest of the supported major destination/target languages and other minor destination/target languages, as mentioned in the previous paragraphs.

The foreign language support databases 629 contain a plurality of conceptually distinct databases to store all of the source language cache web pages, respective destination language translated web pages, and their reverse indexes (for quick search response). These databases include international language reverse index databases, international language web page cache databases, translated language reverse index databases, and translated language web page cache databases as taught herein. The conjugate terms databases 633 contain strings and terms from all of the supported major languages and other minor languages in one column along with a language tags and a plurality of corresponding conjugate destination language strings and terms in a series of succeeding columns. Further, other data constructs, like trees, linked lists, arrays, rows, etc., can be used to construct the data and database used for databases 633. The local storage also contains a thesaurus database 631, containing synonyms to various terms in a plurality of languages, to provide synonym support to the search operations.

In other embodiments, the foreign language support search engine server 607 of the present invention may include fewer or more components than are illustrated as well as lesser or further functionality. In other words, the illustrated foreign language support search engine server is meant to merely offer one example of possible functionality and construction in accordance with the present invention.

FIG. 7 is a snap shot or screen shot of a search result page 705 containing web links of web pages in accordance with system embodiment shown in FIG. 1. Specifically, the snap shot illustrated in FIG. 7 shows a search result page 705 delivered to web browser 795 of a client device (as shown in FIGS. 1-2). The screen of FIG. 7 contains selected source language web links as well as translated web page web links as provided to the web browser in the source and/or destination/target language upon an inquiry (in this case the search string of inquiry is shown in FIG. 7 as 'Drywall' 725).

The search result page 705 that is delivered to the client device may contain a page title such as 'Search Engine's Web Page (www.Search_Engine.com)' 721. It may also contain a title such as 'SEARCH ENGINE.COM' 741 and a tool bar 751 providing access to other selections, menus, or pages of the search engine server or browser. Two language selection tools 745 and 749 that are shown as selecting English 743 (as the source language) and Hindi 747 (as the destination language) may also be provided. This interface (or an interface similar to it) allows users to choose a source language (English, in this case) and a destination language (Hindi, in FIG. 7) as shown in this page/screen example.

A text area such as 'Enter Search String:' 723 and text box 727 are provided to facilitate user's further search, in one of the windows. In this case, "drywall" 725 is the text entered into this field. This user entry window area may also contain buttons/selections such as 'Enable International Terms Support' 729, 'Enable Thesaurus' 733, and 'Enable Translation' 735 or other buttons/selections as illustrated in FIG. 7. These buttons provide user options to perform one or more searches using a source and destination language or languages, synonyms, and translation support in any combination.

In this snap shot of FIG. 7, the search result page 705 shows results for the search string 'Drywall' 725 based upon both the term 'Drywall' itself as well as the conjugate Hindi term 'Gypsum'. The search results based upon the English term 'Drywall' are provided in a second window such as windows 751 and 752, and the window(s) may have a title such as 'Search Results in English Language 755' in FIG. 7. And, the translated search results based upon the Hindi search term 'Gypsum' is provided in another/third window such as window 761 in FIG. 7, where the window has a title 'Search Results in English (Translated from Hindi) 757'. The third window search results are provided because of the user enabling 'Enable International Terms Support' 729 and 'Enable Translation' 735 buttons in the search interface page prior to display of the current search result page 705.

The search result page 705 also contains the 'prev' 785 and 'next' 789 buttons to access prior displayed search result pages and the subsequent search result pages, respectively, and a search button 739 which allows a user to commence one or more searches inside a browser or other application. A helpful note such as "Note: Enabling 'International Terms Support' provides International Web Pages, enabling 'Translation' provides Translated International Web Pages" 393 may also be provided. Other configurations and special/graphic elements may be provided in an interface to the user, so other configurations and schemes other than that shown in FIG. 7 may be used. And, such interfaces may be configurable by a user or an operating system of a computer.

Figure 8:
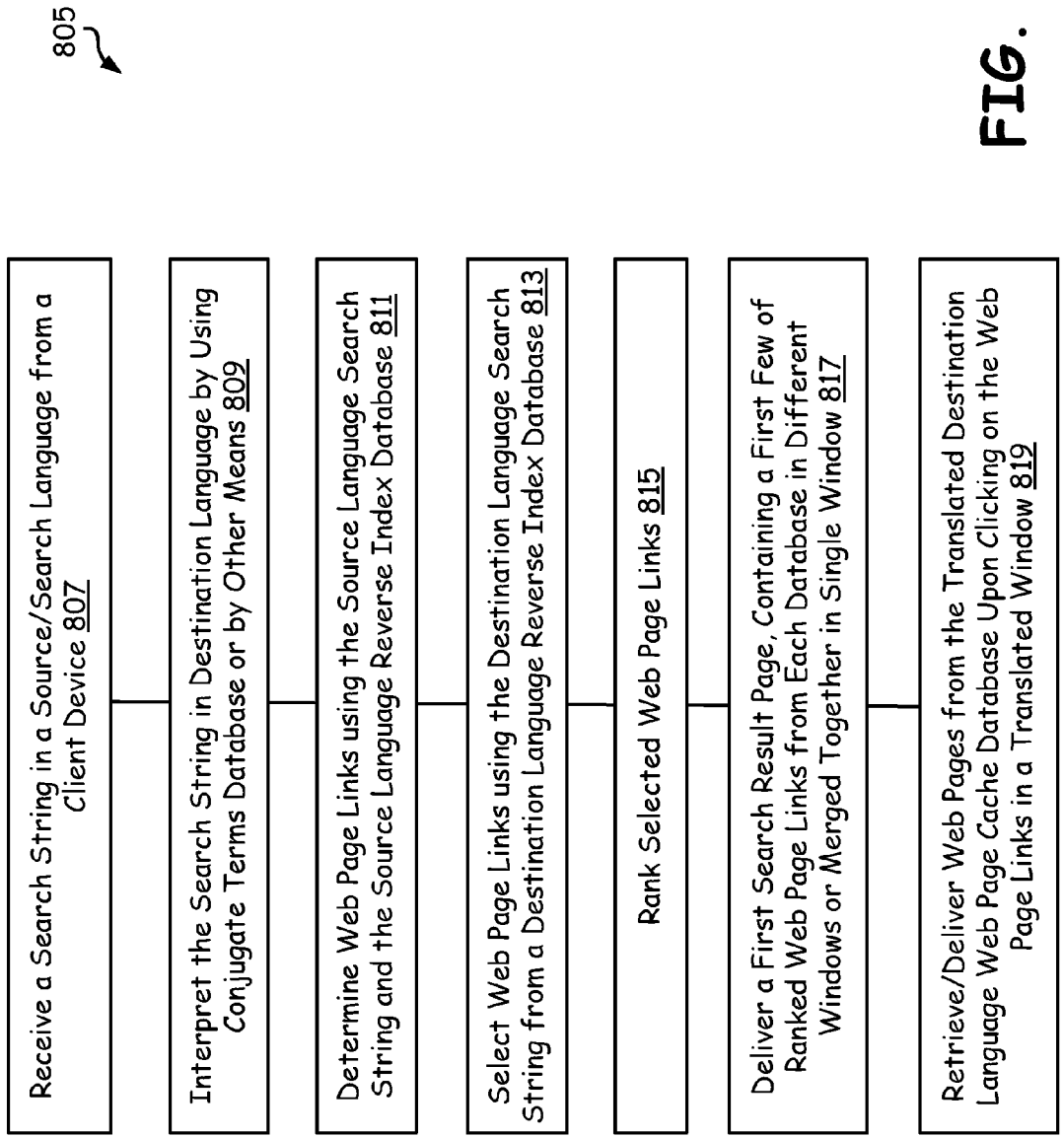
FIG. 8 is a flow diagram illustrating functionality of the search engine server of FIG. 1, during a search operation.

FIG. 8 is a flow diagram 805 illustrating the functionality of the search engine server of FIG. 1, during a search operation. The functionality 805 begins at a block/step 807, with the foreign language support search engine server receiving one or more search strings (in a source/search language, that is, one of the supported major languages listed by and supported by the search engine server) from one or more client devices (see FIGS. 1-2). Then, at a next block/step 809, the search engine server interprets the search string or portions thereof in the destination language by using conjugate terms database or by other means (such as considering the domain name of the search engine's query interface page, or doing language/pattern recognition). The conjugate terms databases contain strings and terms from the source language in one column along with a language tags and a corresponding conjugate destination language strings and terms in other columns, or another data structure.

At a next block/step 811, the search engine server determines applicable search result web page links using a source language search string as processed by a source language reverse index database. That is, the search engine server contains both source (international) language reverse index databases and source (international) language web page cache databases that contain reverse indexes (containing search terms, or strings/phrases, and relevant web links linked to these terms) and cache web pages (frozen web pages at the time of crawling and identifying new web pages), in all of the supported major languages, such as English, German, French, Spanish, Chinese and Hindi. These source language databases contain web pages that are retrieved from the respective servers without any alterations or translations.

At a next block/step 813, the search engine server selects web page links that correlate with the search string or portions thereof using a destination language friendly version of the search string from a destination language reverse index database. The search engine server also contains destination (translated) language reverse index databases and destination (translated) language web page cache databases that contain reverse indexes and cache web pages, respectively, in the destination language. For example, for every English language web page available in an English language web page cache databases, the translated language web page cache databases may contain in their respective destination language databases translated cache web pages in German, French, Spanish, Chinese, and Hindi.

At a next block/step 815, the search engine server ranks selected source and destination language web pages on the basis of extent of match and/or popularity. At a next block/step 817, the search engine server delivers a first search result page containing a first few of the ranked web page links from each of the reverse index databases in different windows or merged together in a single window. At a final block/step 819, the search engine server retrieves and delivers corresponding web pages from the destination (translated) language web page cache database upon clicking on web page links in the translated window or some other interface provided to the user.

Figure 9:
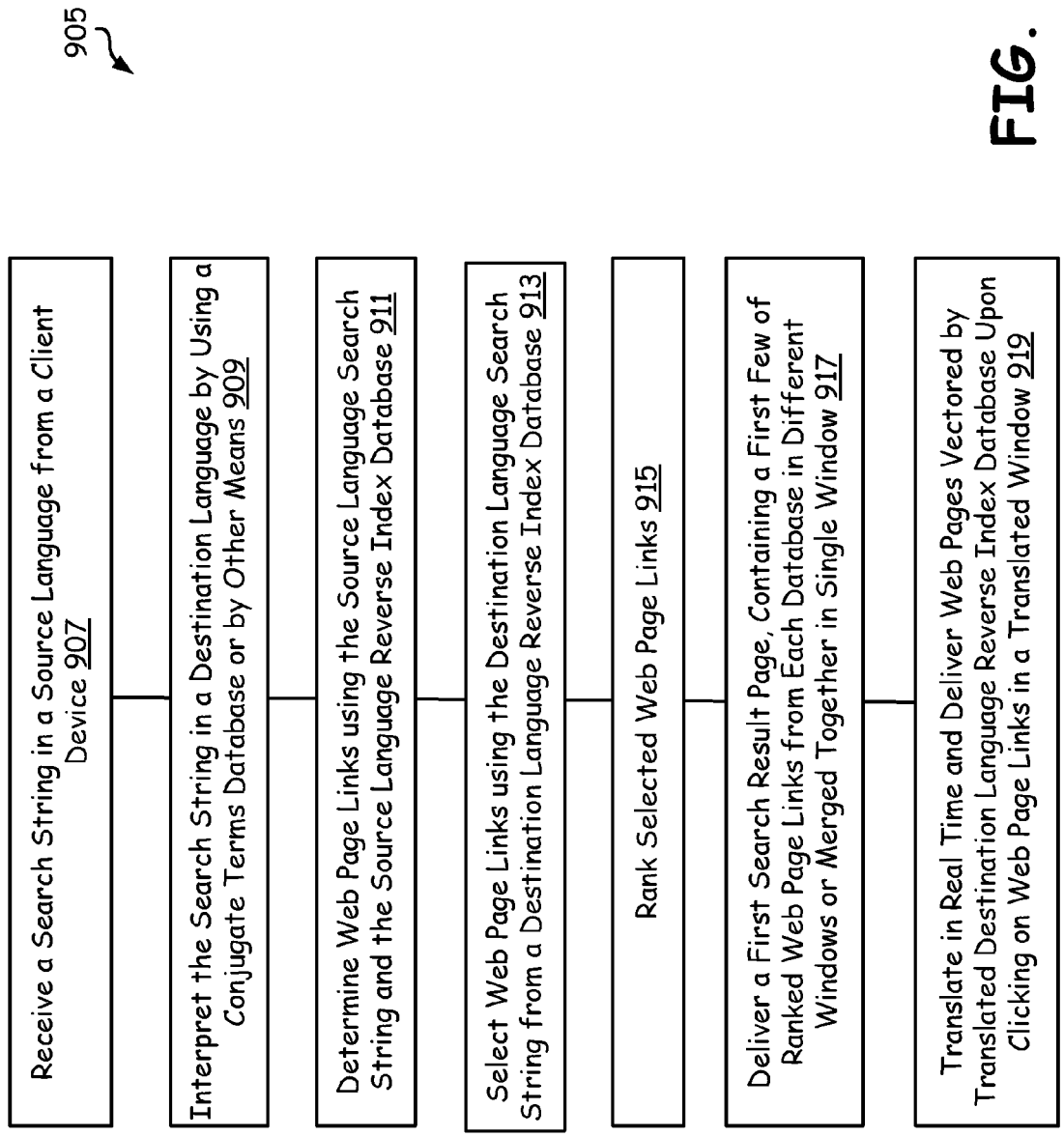
FIG. 9 is a flow diagram illustrating functionality of the search engine server of FIG. 2, during a search operation.

FIG. 9 is a flow diagram illustrating the functionality 905 of the search engine server of FIG. 2, during a search operation. The functionality 905 begins at a block/step 907, with the foreign language support search engine server receiving a search string in a source/search language from the client device. Then, at a next block/step 909, the search engine server interprets/translates/processes the search string as needed to a destination language by using conjugate terms database or by other means (such as considering the domain name of the search engine's query interface page, or performing character/pattern/spatial recognition).

At a next block/step 911, the search engine server determines relevant search result web page links using the source and/or destination language search string from source language reverse index database (the search engine server contains both source (international) language reverse index databases and source (international) language web page cache databases that contain reverse indexes and cache web pages, in all of the supported major languages, such as English, German, French, Spanish, Chinese and Hindi. At a next block/step 913, the search engine server selects search results or web page links using destination language search string from destination language reverse index database. The search engine server also contains destination/translated language reverse index databases and destination/translated language web page cache databases that contain reverse indexes and cache web pages, respectively, in the destination language.

At a next block/step 915, the search engine server ranks selected source and destination language web pages on the basis of extent of match and/or popularity or some other ranking criterion or criteria. At a next block/step 917, the search engine server delivers a first search result page containing a first few of the ranked web page links from each of the reverse index databases in different windows or merged together in a single window. At a final block/step 919, the search engine server retrieves, translates in real time, and delivers corresponding translated web pages upon clicking on web page links in the translated window.

Figure 10:
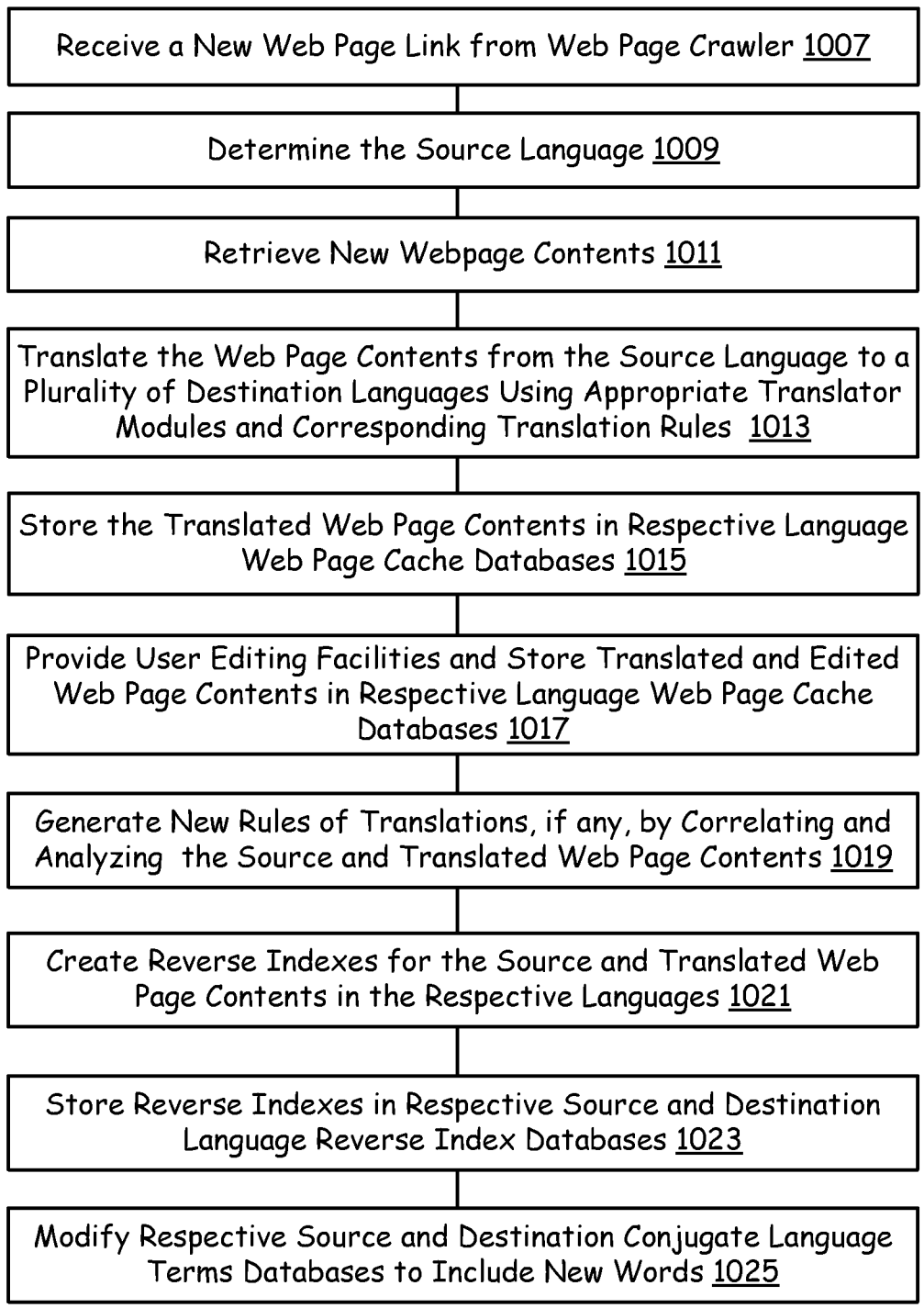
FIG. 10 is a flow diagram illustrating functionality of the search engine server of FIG. 1, wherein the search engine server identifies a new web page in a source language during crawling, translates it to a plurality of destination languages, creates reverse indexes in respective languages, and stores both reverse indexes and cache web pages in a database.

FIG. 10 is a flow diagram that illustrates the functionality 1005 of the search engine server of FIG. 1, wherein the search engine server identifies a new web page in a source language during crawling, translates it to a plurality of destination languages, creates reverse indexes in respective languages, and stores both reverse indexes and cache web pages in a database for later use. The functionality 1005 begins at a block/step 1007, wherein the foreign language support search engine server receives a new web page link from the web page crawler. The web page crawler module identifies the new web pages by a crawling process that is, by jumping to one of the web links presented in one of the web pages, moving to that web page and then moving to another web page by using web links presented in the current web page (a hierarchical traversing of the web page contents and sub-contents).

At a next block/step 1009, the search engine server determines the source language of the new web page. The search engine server determines its source language by either searching through conjugate terms databases (which contains all of the terms and strings in various supported major languages along with meanings or synonyms in rest of the supported major languages), by pattern or character recognition, or by identifying the domain name of the search engine query web page. At a next block/step 1011, the search engine server retrieves the new web page contents (a file or several files from the Internet server).

At a next block/step 1013, the search engine server translates the new web page contents in a source language to one or a plurality of destination languages using appropriate translators modules and corresponding translation rules as taught herein in FIGS. 1-6. At a next block/step 1015, the search engine server stores the translated web page contents in respective web page cache databases. In other words, the translator modules contain a plurality of translators that translate the new web page identified by the web page crawler module during crawling operations to plurality of other languages (destination languages, which in one embodiment is all of the other languages in the supported major languages other than the source language), and stores them in the respective translated language web page cache databases. In all, if there are five supported major languages, for example, then twenty translators are employed to perform translations into rest of the supported major languages. For N languages, where N in an integer, N*(N−1) translators are needed to handle all the pairs of two languages that require translation in the system.

Then, at a next block/step 1017, the search engine server provides user-editing facilities to the users who receive the translated new web page and stores this edited and translated new web page in a respective language web page cache database. Sometimes, the editing can be previewed by an IT expert resident at the server using the interface 649 of FIG. 6 before allowing that user feedback to be incorporated into the server data. At a next block/step 1019, the search engine server generates new rules of translations, if any, by correlating and analyzing the new web page contents and translated and edited new web page contents, as optionally approved by IT oversight as taught herein. That is, the search engine server compares the web pages translated by translator modules and edited by the users with the source web pages by utilizing many inputs such as the ones obtained by the user modifications and corrections and then arrive at rules that would be employed by the translator modules in all future translations, and stores these rules in appropriate databases. In other words, the system can learn or use artificial intelligence methods employed across millions of users to improve its ability to translate over time.

The search engine server, at a next block/step 1021, creates reverse indexes for the new web page and translated new web page contents in the respective languages supported by the server. At a next block/step 1023, the search engine server stores these reverse indexes in respective source and destination language reverse index databases. In other words, the search engine server retrieves stored web page contents contained in the translated language web page cache databases appropriately and creates reverse indexes for each of these cache databases and then stores them in the respective translated language reverse index databases. At a final block/step 1025, the search engine server modifies respective source and destination conjugate terms databases to include new words derived from the new web page and the translated web page.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips or may be split in more sub-component circuits. The term "chip," as used herein, refers to an integrated circuit (IC). Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A search engine system that delivers search results via an Internet, the search engine system comprising:
   at least one processor configured to implement:
   a web crawler module, the web crawler module configured to:
      crawl the Internet to gather a first web page having first text content in a first language;
      identify the first language during crawling operations, at least in part, by processing a domain name;
   a language processing service module, the language processing service module configured to, during the crawling operations, translate the first text content into both a second language in a form of second text content and a third language in a form of third text content using both a thesaurus database and a conjugate terms database;
   at least one database structure, the database structure, during the crawling operations, storing indexed representations of each of the first text content, the second text content, and the third text content; and
   a search processing service configured, in response to receiving search input in the second language, to identify within the at least one database structure at least a portion of the indexed representation of the second text content.

2. The search engine system of claim 1, wherein the search processing service module delivers via web page data search results based at least in part on the indexed representation of the second text content, the search results being at least in part in the second language.

3. The search engine system of claim 1, wherein the search processing service module, in response to receiving search input in the third language, identifies within the at least one database structure at least a portion of the indexed representation of the third text content.

4. The search engine system of claim 3, wherein the search processing service module delivers via web page data search results based at least in part on the indexed representation of the third text content, the search results being at least in part in the third language.

5. The search engine system of claim 1 wherein the at least one database structure comprises a plurality of international language reverse index databases that store reverse indexes in a plurality of respective source languages.

6. The search engine system of claim 1 wherein the at least one database structure comprises a plurality of international language web page cache databases that store cache web pages in a plurality of respective source languages.

7. The search engine system of claim 1 wherein the at least one database structure comprises a plurality of translated language reverse index databases that store reverse indexes in a plurality of destination languages.

8. The search engine system of claim 1 wherein the at least one database structure comprises a plurality of translated language web page cache databases that store cache web pages in a plurality of destination languages.

9. The search engine system of claim 1 wherein the web crawler module identifies the first language, at least in part, using a conjugate international language terms database that comprises terms in the first language and their conjugates in at least the second language.

10. The search engine system of claim 1 wherein a web crawler support module identifies the first language by performing pattern recognition on the first text content.

11. A method performed by a search engine system that delivers search results via an Internet, the method comprising:
   gathering by a web crawler via the Internet a first web page having first text content in a first language;
   identifying the first language during crawling operations, at least in part, using a conjugate international language terms database that comprises terms in the first language and their conjugates in at least the second language;
   translating the first text content into both a second language in a form of second text content and a third language in a form of third text content during the crawling operations using both a thesaurus database and a conjugate terms database;
   storing, during the crawling operations, in at least one database structure indexed representations of each of the first text content, the second text content, and the third text content; and
   in response to receiving search input in the second language, identifying within the at least one database structure at least a portion of the indexed representation of the second text content.

12. The method of claim 11, further comprising delivering via web page data search results based at least in part on the indexed representation of the second text content, the search results being at least in part in the second language.

13. The method of claim 11, further comprising, in response to receiving search input in the third language, identifying within the at least one database structure at least a portion of the indexed representation of the third text content.

14. The method of claim 13, further comprising delivering via web page data search results based at least in part on the indexed representation of the third text content, the search results being at least in part in the third language.

15. The method of claim 11, further comprising storing reverse indexes in a plurality of respective source languages in the at least one database structure.

16. The method of claim 11, further comprising storing cache web pages in a plurality of respective source languages in the at least one database structure.

17. The method of claim 11, further comprising storing reverse indexes in a plurality of destination languages in the at least one database structure.

18. The method of claim 11, further comprising storing cache web pages in a plurality of destination languages in the at least one database structure.

19. The method of claim 11, further comprising identifying the first language, at least in part, by processing a domain name.

20. The method of claim 11, further comprising identifying the first language by performing pattern recognition on the first text content.

* * * * *